US009343035B2

(12) United States Patent
Lin et al.

(10) Patent No.: US 9,343,035 B2
(45) Date of Patent: May 17, 2016

(54) TRANSMISSION OF VIDEO IN WIRELESS ENVIRONMENT

(71) Applicant: NATIONAL CHIAO TUNG UNIVERSITY, Hsinchu (TW)

(72) Inventors: Hsuan-Li Lin, Taipei (TW); Tung-Yu Wu, Hsinchu (TW); Kung-Hsien Yu, Nantou County (TW); Chin-Yao Huang, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 203 days.

(21) Appl. No.: 14/027,091

(22) Filed: Sep. 13, 2013

(65) Prior Publication Data

US 2014/0267789 A1    Sep. 18, 2014

(30) Foreign Application Priority Data

Mar. 13, 2013  (TW) .............................. 102108916 A (51) Int. Cl.
| | |
|---|---|
| H04N 21/4363 | (2011.01) |
| H04N 21/647 | (2011.01) |
| H04N 17/00 | (2006.01) |
| G09G 5/00 | (2006.01) |
| H04N 21/434 | (2011.01) |
| H04N 21/442 | (2011.01) |

(52) U.S. Cl.
CPC .............. *G09G 5/00* (2013.01); *H04N 21/4344* (2013.01); *H04N 21/43637* (2013.01); *H04N 21/44227* (2013.01)

(58) Field of Classification Search
CPC .............. H04L 1/0075; H04L 41/509; H04W 28/0231; H04N 21/43637; H04N 17/004
USPC ........... 714/776, 704; 370/252, 230; 348/192, 348/193; 725/62
See application file for complete search history.

(56) References Cited

U.S. PATENT DOCUMENTS

| | | | | |
|---|---|---|---|---|
| 6,999,432 | B2 * | 2/2006 | Zhang et al. ................... | 370/328 |
| 9,030,961 | B2 * | 5/2015 | Ramamurthi et al. ........ | 370/253 |
| 2013/0298170 | A1 * | 11/2013 | ElArabawy et al. ............ | 725/62 |

* cited by examiner

*Primary Examiner* — Phung M Chung
(74) *Attorney, Agent, or Firm* — The PL Law Group, PLLC (57) ABSTRACT

A video transmission method is provided. The video transmission method includes providing a wireless transmission environment for transmitting a video, wherein the wireless transmission environment includes an application layer, a media access control (MAC) layer and a physical layer; detecting a delay bound and a frame error rate (FER) of the video in the wireless transmission environment; detecting a present packet error rate (PER) of a packet in the physical layer when the physical layer transmits an error report to the MAC layer; calculating an estimated PER; comparing the present PER and the estimated PER for providing a determined result; and calculating an optimal video rate of the video and an optimal payload length of the packet using a geometric programming scheme when the determined result indicates that a retransmission is required, wherein the geometric programming scheme is based on the delay bound and the FER.

16 Claims, 5 Drawing Sheets

TRANSMISSION OF VIDEO IN WIRELESS ENVIRONMENT

CROSS REFERENCE TO RELATED APPLICATION

The present invention claims the benefits of priority from the Taiwanese Patent Application No. 102108916, filed on Mar. 13, 2013, the contents of the specification of which are hereby incorporated herein by reference.

FIELD OF THE INVENTION

The present invention relates to a video transmission method. In particular, it relates to a high-definition video transmission method in a wireless transmission environment.

BACKGROUND OF THE INVENTION

In the environment of entertainment application of digital home, HDMI and DVI were the two main specifications for TV accessories. In view of the present application, the penetration rate of HDMI in digital TV and digital home accessories is higher than that of DVI. Therefore, HDMI, which is wired, is the main interface as a communication standard of digital video and audio entertainment transmission since there is shortage of wireless video transmission technology. However, compared to the wired technique, the wireless technique has advantages of low deployment cost, good appearance, and mobility over the wired technique. Thus, the wireless technique will be the future trend for digital home video and audio transmission application in the long-term.

In view of high-definition television transmission, it's important to guarantee that there are no losses in the bandwidth and packet. As to the wireless transmission technique, the non-compressed 720p/1080i video data requires a bandwidth of 1.5 Gbit/s; the compressed H.264 MPEG4 AVC video data requires a bandwidth in a range of 2~15 Mbit/s; and the non-compressed 1080p video data requires a bandwidth in a range of 3~5 Gbit/s. The data has to be compressed since the bandwidth required therefor is too large for the WLAN. Regarding the wireless network technology, the 802.11n standard was not designed for video and audio transmission but for data transmission. The focus of data transmission is a rapid transmission rate so that some errors are tolerable. There is a function of rate adaptation in such technology. Even if there are errors in the information transmission, a retransmission can fix it. As to video and audio transmission, a stable transmission requires an adequate rate since the timing is essential for video and audio, i.e. stability is more important than speed while the rate is sufficient. It needs some particular designs to transmit video and audio over WiFi so as to satisfy the requirements of high-definition video and audio transmission under the present technology.

In regard to a smooth video streaming, the prior art, which restricted packet error rate, renders inefficient usage of wireless resources. Moreover, the multimedia transmission is unstable in the optimal throughput method since the requirements of packet error rate or the quality of service were not considered therefor.

It is therefore attempted by the applicant to deal with the above limitations of the prior art.

SUMMARY OF THE INVENTION

In a video transmission method for lowering a video distortion rate, the video transmission method comprises providing a wireless transmission environment; detecting a delay bound and a video frame error rate; verifying a packet error rate to provide a determined result; and calculating a global optimal by a geometric programming scheme when a retransmission is required according to the result, the delay bound, and the packet error rate.

In a video transmission method for use in a wireless transmission environment, the video transmission method comprises detecting a delay bound; verifying a packet error rate to provide a determined result; and automatically adjusting a link profile according to the determined result and the delay bound.

In a video transmission method for use in a wireless transmission environment, the video transmission method comprises detecting a video frame error rate; verifying a packet error rate to provide a determined result; and automatically adjusting a link profile according to the determined result and the video frame error rate.

BRIEF DESCRIPTION OF THE DRAWINGS

A more complete appreciation of the invention and many of the attendant advantages thereof are readily obtained as these become better understood by reference to the following detailed description when considered in connection with the accompanying drawing, wherein.

DETAILED DESCRIPTION OF THE PREFERRED EMBODIMENT

The present disclosure will be described with respect to particular embodiments and with reference to certain drawings, but the disclosure is not limited thereto but is limited only by the claims. The drawings described are only schematic and are non-limiting. In the drawings, the size of some of the elements may be exaggerated and not drawn to scale for illustrative purposes. The dimensions and the relative dimensions do not necessarily correspond to actual reductions in practice.

It is to be noted that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described with a detailed description of several embodiments. It is clear that other embodiments can be configured according to the knowledge of persons skilled in the art without departing from the true technical teaching of the present disclosure, the claimed disclosure being only limited by the terms of the appended claims.

Figure 1:
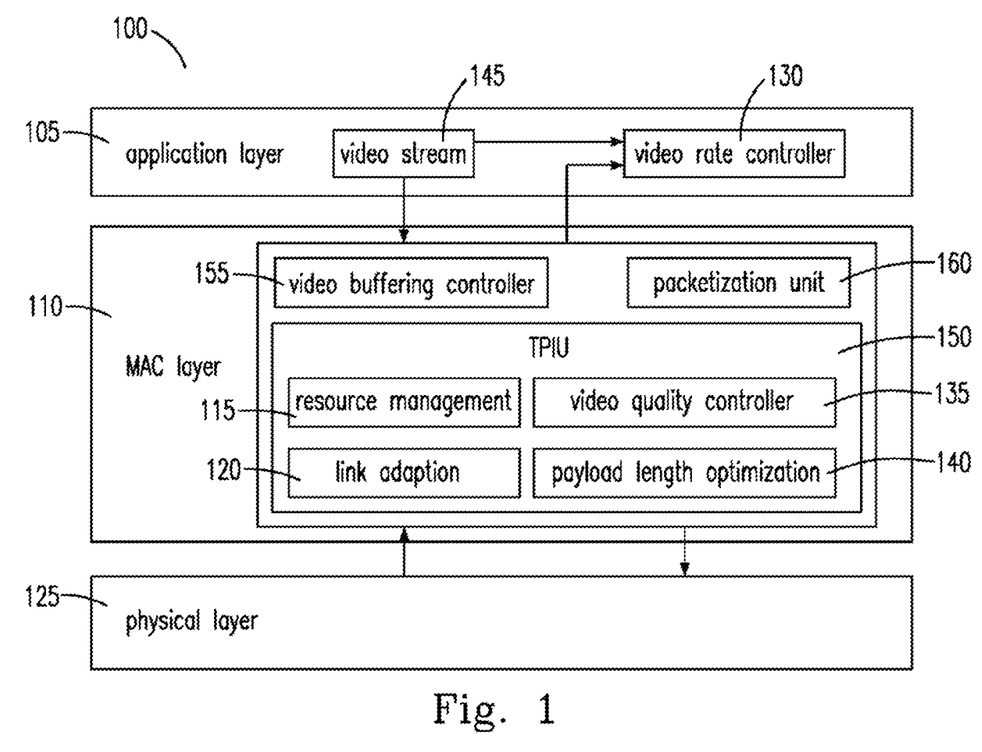
FIG. 1 is a schematic diagram of the cross-layer system of the present invention.

Please refer to FIG. 1 disclosing a schematic diagram of the cross-layer system of the present invention. In certain embodiments, the structure of the cross-layer system 100 includes an application layer 105, a media access control layer 110 and a physical layer 125. Preferably, the cross-layer system 100 includes a video stream 145, a video rate controller 130, a transmission performance improvement unit (TPIU) 150, a video frame buffering controller 155 and a packetization unit 160, wherein the TPIU 150 further includes a resource management unit 115, a video quality controller unit 135, a link adaptation unit 120 and a payload length optimization unit 140. Preferably, the wireless environments which are able to be applied with the cross-layer system 100 include 3GPP LTE-Advanced, WiMedia, or other wireless communication environments.

According to certain embodiments, the cross-layer system 100 includes quality of service (QoS) parameters, quality of wireless channels parameters and link profiles. The QoS parameters include delay bound, frame error rate and rate distortion. The quality of wireless channels parameters include signal-to-noise ratio (SNR) and bit error rate. The link profiles include video rate, payload length, packet error rate and a modulation and coding scheme (MCS) index.

In certain embodiments, the built-in MCS index is selected by the TPIU 150 and transmitted to the physical layer 125 for channel modulation and coding according to the rate distortion of the video stream 145 and the SNR received from the physical layer 125.

In certain embodiments, the payload length optimization unit 140 computes an optimal payload length and an optimal video rate according to rate distortion, the limitation of the delay bound, and SNR, wherein the optimal payload length is provided as a processing basis for the packetization unit 160, and the optimal video rate is offered for the video quality controller unit 135 to control the video rate controller 130. Preferably, the resource management unit 115 schedules users and controls the amounts therefor according to the radio resources computed by the TPIU 150.

According to certain embodiments, the physical layer 125 transmits a report to the media access control layer 110 if there are errors when decoding packets. The media access control layer 110 checks whether the present packet error rate exceeds the estimated packet error rate after receiving the report. If the present packet error rate is lower than the estimated packet error rate, the link profiles remain unchanged. If the present packet error rate is higher than the estimated packet error rate, the present packet error rate will be used to compute an equivalent bit error rate, and new link profiles will be computed by a minimum video distortion optimization scheme.

Figure 2:
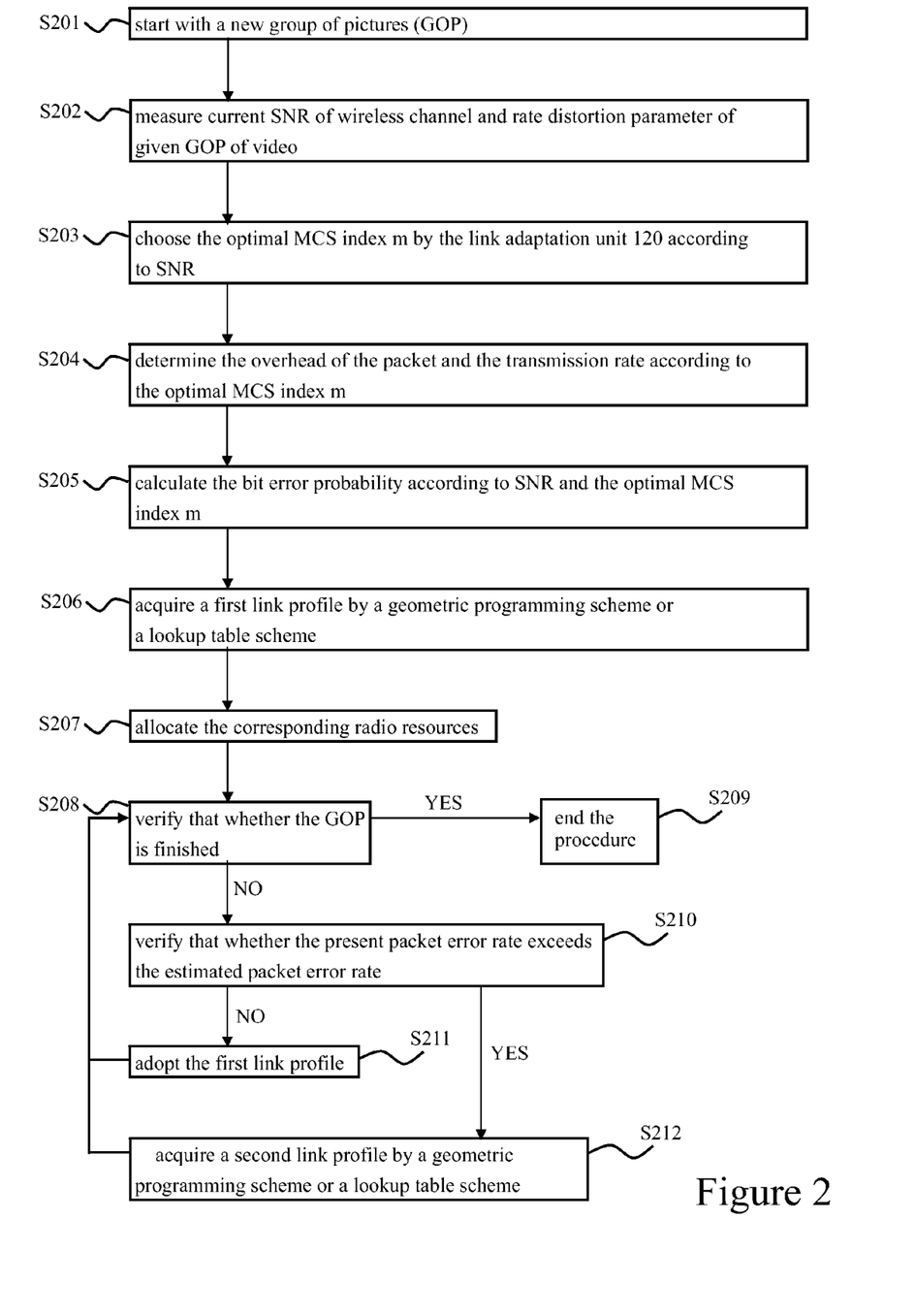
FIG. 2 is a flow chart of the minimum video distortion optimization scheme of the present invention.

Please refer to FIG. 2 disclosing a flow chart of the minimum video distortion optimization scheme of the present invention. Step S201: start with a new group of pictures (GOP). Step S202: measure the current SNR of wireless channel and rate distortion parameter of given GOP of video to be transmitted. Step S203: choose the optimal MCS index m by the link adaptation unit 120 according to the SNR. Step S204: determine the overhead of the packet and the transmission rate according to the optimal MCS index m. Step S205: calculate the bit error probability according to the SNR and the optimal MCS index m. Step S206: acquire a first link profile by a geometric programming scheme or a lookup table scheme. Step S207: allocate the corresponding radio resources. Step S208: verify whether the GOP is finished. If the GOP is finished, go to Step S209 to end the procedure. If the GOP is not finished, go to Step S210. Step S210: verify that whether the present packet error rate exceeds the estimated packet error rate. If the present packet error rate exceeds the estimated packet error rate, go to Step S212 or else go to Step S211. Step S212, adopt the first link profile and go to Step S208. Step S211: acquire a second link profile by a geometric programming scheme or a lookup table scheme and go to Step S208.

According to certain embodiments, the geometric programming is a scheme using a geometric programming algorithm to calculate the optimal packet length and the optimal video rate, wherein there are scenarios for a single user and multi-users. Preferably, the geometric programming algorithm for a single user is elaborated as follows, wherein $D_0$ is the video content complexity, $\theta_0$ is the coding scheme, $R_0$ is the encoder configuration, $V_R$ is the video rate, L is the payload length, $N_R$ is the number of total transmitted packets for a GOP, m is the mode of the physical layer including the modulation and coding scheme, $N_F$ is the packet numbers for a GOP, P is the packet success rate, $\gamma$ is the SNR, and Pout is the target outage rate.

$$\min_{V_R, L, N_R, m} D(V_R) = D_0 + \frac{\theta_0}{V_R - R_0}$$

subject to $$\binom{N_R}{i} P(\gamma, L, m)^i * (1 - P(\gamma, L, m))^{N_R - i} \leq P_{out},$$

$$N_R(L) \times T(L, m) \leq \text{Deadline}$$

$$D_Z = F(V_R)$$

$$N_F(L) = \frac{D_Z}{8L}$$

$$L > 0$$

where $$F(V_R) = GOP \text{ Time} \times 1000 \times V_R,$$

After the conversion, the following algorithm is an optimization problem which can be solved by the geometric programming algorithm.

$$\min_{V_R, m, L} D(V_R) = D_0 + \frac{\theta_0}{V_R - R_0}$$

subject to $$D_Z = F(V_R)$$

$$\left\{ N_F + \left( e - \frac{\sqrt{(4 \times N_F) \times (8 \times L \times P_u^m(\gamma))}}{4(1 - 8 \times L \times P_u^m(\gamma))} \right)^2 \right\} \times \left\{ \frac{8L}{R(m)} + O_t(m) \right\} \leq$$

Deadline $$N_F(L) = \frac{D_Z}{8L}$$

$$L \geq 0$$

According to certain embodiments, the following is a geometric programming algorithm for the multi-user scenario, wherein S is the user set.

$$\min_{V_R^s, N_R^s, m^s, L^s} \sum_{s \in S} D^s(V_R^s)$$

subject to $$D_Z^s = F(V_R^s), \forall s \in S$$

-continued $$\sum_{i^s=0}^{N_F^s-1} \binom{N_R^s}{i^s} P^s(\gamma^s, L^s, m^s)^{i^s} * (1 - P^s(\gamma^s, L^s, m^s))^{N_R^s - i^s} \leq P_{out}^s, \forall s \in S$$

$$\sum_{s \in S} N_R^s(L^s) \times T^s(L^s, m^s) \leq \text{Deadline}, \forall s \in S$$

$$N_F^s(L^s) = \frac{Dz^s}{8L^s}, \forall s \in S$$

$$L^s \geq 0, \forall s \in S$$

According to certain embodiments, the following is a solution to the aforementioned optimization problem solved by the geometric programming algorithm. An optimization problem for a multi-user scenario is elaborated as follows.

$$\min_{V_R^s, q^s, L^s, m^s, k^s} \sum_{s \in S} D^s(V_R^s) = D_0^s + \theta_0^s \times q^s$$

subject to $$N_F^s(L^s) = \frac{Dz^s}{8L^s}, \forall s \in S$$

$$\sum_{s \in S} \left\{ N_F^s + \left(e^s - \sqrt{(4 \times N_F^s) \times (8 \times L^s \times P_u^m(\gamma)^s)}\right)^2 \times k^s \right\} \times$$

$$\left\{ \frac{8L^s}{R(m)^s} + O_i(m)^s \right\} \leq \text{Deadline}$$

$$\frac{1}{4k^s} + 8 \times L^s \times P_u^m(\gamma)^s \leq 1, \forall s \in S$$

$$D_Z^s = F(V_R^s), \forall s \in S$$

$$\frac{1}{q^s} + R_0^s \leq V_R^s, \forall s \in S$$

$$L^s \geq 0, \forall s \in S$$

Preferably, it can be solved by the lookup table established by the geometric programming scheme, wherein the geometric programming scheme can establish corresponding tables of video rate, delay bound, frame error rate, modulation and coding scheme index, bit error rate, and rate distortion, and establish corresponding tables of packet length, delay bound, frame error rate, modulation and coding scheme index, bit error rate, and rate distortion.

Figure 3:
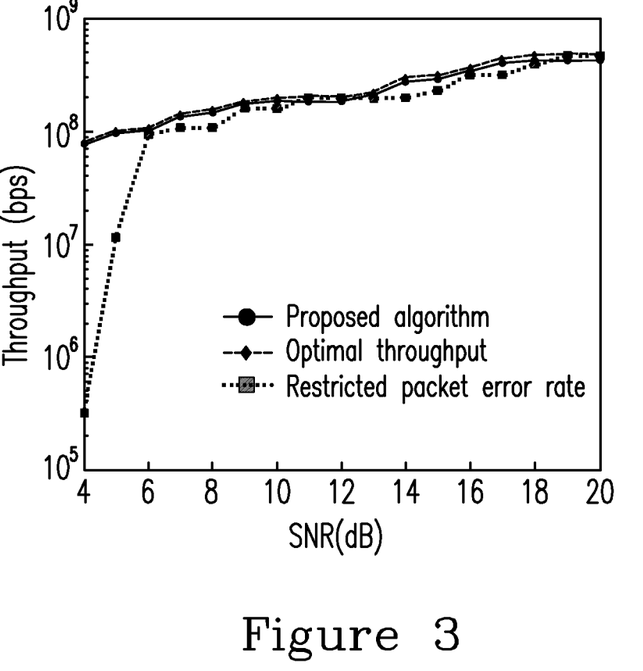
FIGS. 3 and 4 are throughput-SNR and packet error rate-SNR comparison charts in view of the prior arts and the present invention.
Figure 4:
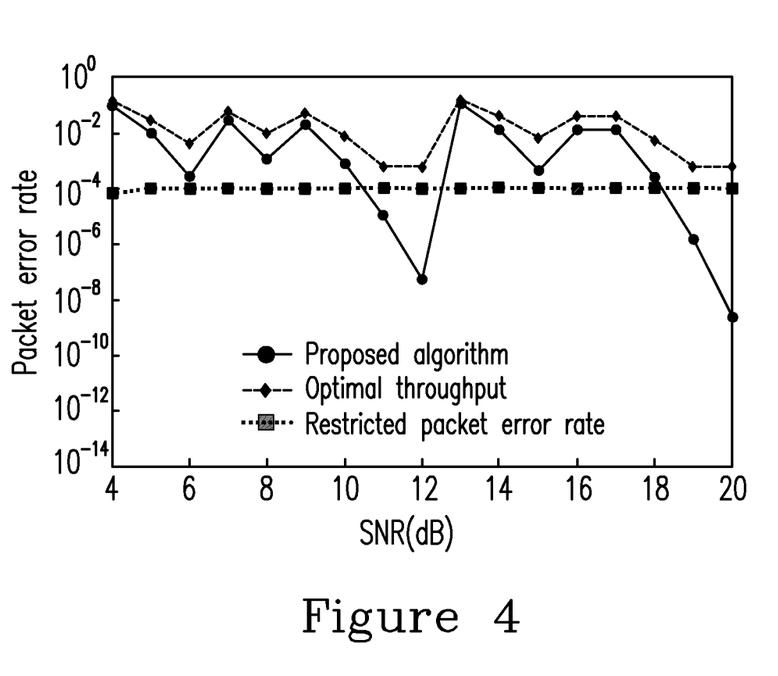

Please refer to FIGS. 3 and 4 disclosing throughput-SNR and packet error rate-SNR comparison charts in view of the prior art and the present invention. In FIG. 3, the throughputs of the present invention are higher than those of the restricted packet error rate method in every different SNR, and close to those of the optimal throughput method. As shown in FIG. 4, it takes more time to achieve the target outrage rate in the optimal throughput method since there is a higher packet error rate therein. The large portion of burden in the restricted packet error rate method causes a lower effective data rate and longer required transmission time. Nevertheless, since there is no need to shorten the packet length in the present invention, the throughput can be increased while minimizing the required transmission time.

Preferably, the present invention, which is different from the prior art controlling the packet error rate by limiting the packet length, enhances the transmission quality of scalable high definition video in the wireless environment by the minimum video distortion optimization scheme with a delay bound retransmission policy.

Preferably, the present invention can be applied with different coding schemes such as Turbo Code, Convolution Code, Block Code, and other coding schemes. Preferably, the present invention can be applied with different physical layer schemes such as a Multiple Inputs Multiple Outputs (MIMO) scheme, an Orthogonal Frequency Division Multiplexing (OFDM) scheme, etc. Preferably, the present invention can be applied with different application layer media schemes such as Scalable Video Coding (SVC), H.264, etc.

Preferably, it is proved that there is a global optimal in the packet length and data speed of video according to the algorithm of the present invention, and the advantages of the present invention are elaborated as follows. (1) Video distortion minimization: the present invention achieves the minimized video distortion while meeting the outrage rates lower than those of the prior art, and the present invention is more suitable to be applied under low SNR conditions. (2) Automatic parameter determination: the present invention can automatically select parameters of the MAC layer, such as packet length, parameters of the physical layer, such as the MCS index, and parameters of the application layer, such as the video rate, to lower the video distortion.

Figure 5:
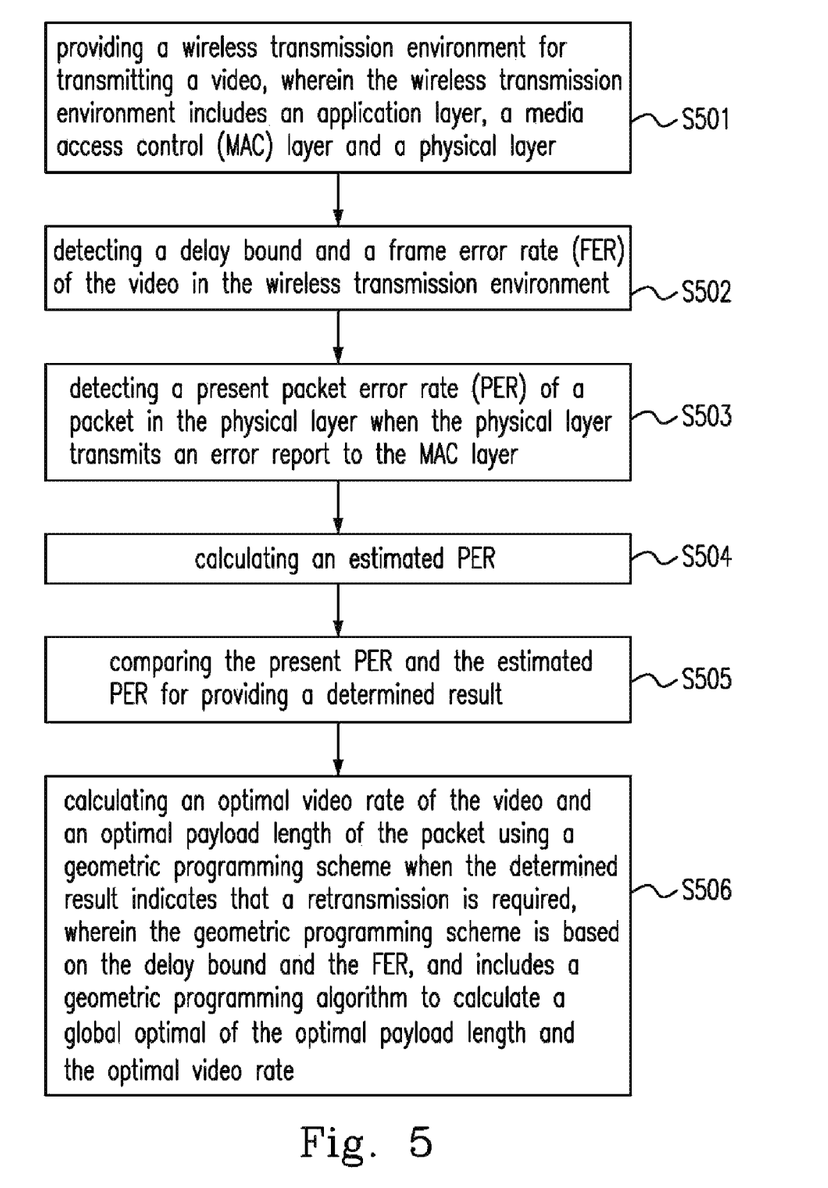
FIG. 5 is a flow chart of one embodiment of the present invention.

Please refer to FIG. 5 disclosing a flow chart of one embodiment of the present invention. Step S501: providing a wireless transmission environment for transmitting a video, wherein the wireless transmission environment includes an application layer, a media access control (MAC) layer and a physical layer. Step S502: detecting a delay bound and a frame error rate (FER) of the video in the wireless transmission environment. Step S503: detecting a present packet error rate (PER) of a packet in the physical layer when the physical layer transmits an error report to the MAC layer. Step S504: calculating an estimated PER. Step S505: comparing the present PER and the estimated PER for providing a determined result. Step S506: calculating an optimal video rate of the video and an optimal payload length of the packet using a geometric programming scheme when the determined result indicates that a retransmission is required, wherein the geometric programming scheme is based on the delay bound and the FER, and includes a geometric programming algorithm to calculate a global optimal of the optimal payload length and the optimal video rate.

There are further embodiments provided as follows.

Embodiment 1

A video transmission method includes providing a wireless transmission environment; detecting a delay bound and a video frame error rate; verifying a target packet error rate for providing a determined result; and calculating a video rate and a payload length of a packet when a retransmission is required according to the determined result, the delay bound, and the video frame error rate.

Embodiment 2

In the video transmission method according to above-mentioned embodiment, the video transmission method further includes processing a rate distortion parameter and a video rate from an application layer; receiving a packet length from a media access control layer; and selecting a modulation and coding scheme index according to the rate distortion parameter and a signal-to-noise ratio acquired from a physical layer.

Embodiment 3

In the video transmission method according to above-mentioned embodiment 1 or 2, the video transmission method further includes sending the modulation and coding scheme index to the physical layer for processing one of a channel coding and a modulation; and calculating a bit error rate.

Embodiment 4

In the video transmission method according to any of above-mentioned embodiments 2-3, the video transmission method further includes calculating an optimal packet length and an optimal video rate according to the rate distortion parameter, the delay bound, the bit error rate and the signal-to-noise ratio.

Embodiment 5

In the video transmission method according to any of above-mentioned embodiments 2-4, the video transmission method further includes calculating an estimated packet error rate according to the video rate, the modulation, the coding scheme index and the packet length.

Embodiment 6

In the video transmission method according to any of above-mentioned embodiments 2-5, the verifying step further includes comparing the target packet error rate and the estimated packet error rate for providing the determined result.

Embodiment 7

In the video transmission method according to any of above-mentioned embodiments 2-6, the wireless transmission environment is compatible with one selected from a group consisting of a 3GPP LTE-Advanced protocol, a WiMedia protocol, a WiFi protocol and a combination thereof.

Embodiment 8

In the video transmission method according to any of above-mentioned embodiments 2-7, there is one user in the wireless transmission environment.

Embodiment 9

In the video transmission method according to any of above-mentioned embodiments 2-8, there are a plurality of users in the wireless transmission environment.

Embodiment 10

In the video transmission method according to any of above-mentioned embodiments 2-9, the video transmission method further includes calculating a global optimal by a geometric programming lookup table scheme.

Embodiment 11

In the video transmission method according to any of above-mentioned embodiments 2-10, the geometric programming scheme includes a geometric programming algorithm to calculate the optimal packet length and the optimal video rate.

Embodiment 12

In the video transmission method according to any of above-mentioned embodiments 2-11, the geometric programming algorithm generates a minimum value of a distortion of a video rate for a single user scenario. The geometric programming algorithm is represented by a formula (I):

$$\min_{V_R, L, N_R, m} D(V_R) = D_0 + \frac{\theta_0}{V_R - R_0}$$

subject to $$\binom{N_R}{i} P(\gamma, L, m)^i * (1 - P(\gamma, L, m))^{N_R - i} \leq P_{out},$$

$$N_R(L) \times T(L, m) \leq \text{Deadline}$$

$$D_Z = F(V_R)$$

$$N_F(L) = \frac{D_Z}{8L}$$

$$L > 0 \text{ where } F(V_R) = GOP \text{ Time} \times 1000 \times V_R,$$

$D_0$ is the video content complexity, $\theta_0$ is a coding scheme, $R_0$ is an encoder configuration, $V_R$ is the video rate, L is a payload length, $N_R$ is a number of total transmitted packets for a GOP, m is a mode of the physical layer including a modulation and coding scheme, $N_F$ is a packet numbers of a GOP, P is a packet success rate, $\gamma$ is an SNR, and $P_{out}$ is a target outage rate.

Embodiment 13

In the video transmission method according to any of above-mentioned embodiments 2-12, the geometric programming algorithm further generates the minimum value of the distortion of the video rate for the single user scenario. The geometric programming algorithm is represented by a formula (II):

$$\min_{V_R, m, L} D(V_R) = D_0 + \frac{\theta_0}{V_R - R_0}$$

subject to $$D_Z = F(V_R)$$

$$\left\{ N_F + \left( e - \frac{\sqrt{(4 \times N_F) \times (8 \times L \times P_u^m(\gamma))}}{4(1 - 8 \times L \times P_u^m(\gamma))} \right)^2 \right\} \times \left\{ \frac{8L}{R(m)} + O_t(m) \right\} \leq$$

Deadline $$N_F(L) = \frac{D_Z}{8L}$$

$$L \geq 0$$

Embodiment 14

In the video transmission method according to any of above-mentioned embodiments 2-13, the geometric programming algorithm generates a sum of respective minimum values of distortions of video rates for a multi-user scenario. The geometric programming algorithm is represented by a formula (III):

$$\min_{V_R^s, N_R^s, m^s, L^s} \sum_{s \in S} D^s(V_R^s)$$

subject to

-continued $$D_Z^s = F(V_R^s), \forall s \in S$$

$$\sum_{i^s=0}^{N_F^s-1} \binom{N_R^s}{i^s} P^s(\gamma^s, L^s, m^s)^{i^s} * (1 - P^s(\gamma^s, L^s, m^s))^{N_R^s - i^s} \le P_{out}^s, \forall s \in S$$

$$\sum_{s \in S} N_R^s(L^s) \times T^s(L^s, m^s) \le \text{Deadline}, \forall s \in S$$

$$N_F^s(L^s) = \frac{Dz_u^s}{BL^s}, \forall s \in S$$

$$L^s \ge 0, \forall s \in S$$

wherein S is the user set, $D_0^S$ is the video content complexity in the user set, $\theta_0^S$ is a coding scheme in the user set, $R_0^S$ is an encoder configuration in the user set, $V_R^S$ is the video rate in the user set, $L^S$ is a payload length in the user set, $N_R^S$ is a number of total transmitted packets for a GOP in the user set, $m^S$ is a mode of the physical layer including a modulation and coding scheme in the user set, $N_F^S$ is a packet numbers of a GOP in the user set, $P^S$ is a packet success rate in the user set, $\gamma^S$ is an SNR in the user set, and $P_{out}^S$ is a target outage rate in the user set.

Embodiment 15

In the video transmission method according to any of above-mentioned embodiments 2-14, the geometric programming algorithm further generates the sum of respective minimum values of distortions of video rates for the multi-user scenario. The geometric programming algorithm is represented by a formula (IV):

$$\min_{V_R^s, q^s, L^s, m^s, k^s} \sum_{s \in S} D^s(V_R^s) = D_0^s + \theta_0^s + \theta_0^s \times q^s$$

subject to $$N_F^s(L^s) = \frac{Dz_u^s}{8L^s}, \forall s \in S$$

$$\sum_{s \in S} \left\{ N_F^s + \left( e^s - \sqrt{(4 \times N_F^s) \times (8 \times L^s \times P_u^m(\gamma)^s)} \right)^2 \times k^s \right\} \times$$

$$\left\{ \frac{8L^s}{R(m)^s} + O_t(m)^s \right\} \le \text{Deadline}$$

$$\frac{1}{4k^s} + 8L^s \times P_u^m(\gamma)^s \le 1, \forall s \in S$$

$$D_Z^s = F(V_R^s), \forall s \in S$$

$$\frac{1}{q^s} + R_0^s \le V_R^s, \forall s \in S$$

$$L^s \ge 0, \forall s \in S$$

Embodiment 16

A video transmission method for being used in a wireless transmission environment includes detecting a delay bound; verifying a packet error rate for providing a determined result; and automatically adjusting a link profile according to the determined result and the delay bound.

Embodiment 17

In the video transmission method according to above-mentioned embodiment, the automatically adjusting step includes a geometric programming scheme using a geometric programming algorithm to calculate an optimal packet length and an optimal video rate.

Embodiment 18

A video transmission method for use in a wireless transmission environment includes detecting a video frame error rate; verifying a packet error rate for providing a determined result; and automatically adjusting a link profile according to the determined result and the video frame error rate.

Embodiment 19

In the video transmission method according to above-mentioned embodiment, the automatically adjusting step includes a geometric programming scheme using a geometric programming algorithm to calculate an optimal packet length and an optimal video rate.

Embodiment 20

In the video transmission method according to above-mentioned embodiment 18 or 19, the geometric programming scheme is applicable to one selected from a Multiple Inputs Multiple Outputs (MIMO) scheme, an Orthogonal Frequency Division Multiplexing (OFDM) scheme, a Scalable Video Coding (SVC) scheme and an H.264 standard.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:
1. A video transmission method, comprising:
   providing a wireless transmission environment for transmitting a video, wherein the wireless transmission environment includes an application layer, a media access control (MAC) layer and a physical layer;
   detecting a delay bound and a frame error rate (FER) of the video in the wireless transmission environment;
   detecting a present packet error rate (PER) of a packet in the physical layer when the physical layer transmits an error report to the MAC layer;
   calculating an estimated PER;
   comparing the present PER and the estimated PER for providing a determined result; and
   calculating an optimal video rate of the video and an optimal payload length of the packet using a geometric programming scheme when the determined result indicates that a retransmission is required, wherein the geometric programming scheme is based on the delay bound and the FER, and includes a geometric programming algorithm to calculate a global optimal of the optimal payload length and the optimal video rate.
2. The video transmission method according to claim 1, further comprising:
   processing a rate distortion parameter and a video rate from the application layer;

receiving a packet length from the MAC layer; and
selecting a modulation and coding scheme (MCS) index according to the rate distortion parameter and a signal-to-noise ratio acquired from the physical layer.

3. The video transmission method according to claim 2, further comprising:
sending the modulation and coding scheme index to the physical layer for processing one of a channel coding and a modulation; and
calculating a bit error rate.

4. The video transmission method according to claim 3, wherein the geometric programming scheme uses the rate distortion parameter, the bit error rate and the signal-to-noise ratio for calculation.

5. The video transmission method according to claim 4, wherein the estimated PER is calculated according to the video rate, the MCS index and the packet length.

6. The video transmission method according to claim 1, wherein the wireless transmission environment is compatible with one selected from a group consisting of a 3GPP LTE-Advanced protocol, a WiMedia protocol, a WiFi protocol and a combination thereof.

7. The video transmission method according to claim 1, wherein the geometric programming algorithm is used for a single user scenario when there is one user in the wireless transmission environment.

8. The video transmission method according to claim 1, wherein the geometric programming algorithm is used for a multi-user scenario when there are a plurality of users in the wireless transmission environment.

9. The video transmission method according to claim 1, wherein the geometric programming scheme is $$\min_{V_R, L, N_R, m} D(V_R) = D_0 + \frac{\theta_0}{V_R - R_0}$$

$$\binom{N_R}{i} P(\gamma, L, m)^i * (1 - P(\gamma, L, m))^{N_R - i} \leq P_{out},$$

$$N_R(L) \times T(L, m) \leq \text{Deadline}$$

$$D_Z = F(V_R),$$

$$N_F(L) = \frac{D_Z}{8L}$$

$L > 0$ where $F(V_R) = GOP \text{ Time} \times 1000 \times V_R$, a geometric programming lookup table scheme.

10. The video transmission method according to claim 1, wherein the geometric programming algorithm generates a minimum value of a distortion of a video rate for a single user scenario, represented by a formula (I):

$$\min_{V_R, L, N_R, m} D(V_R) = D_0 + \frac{\theta_0}{V_R - R_0}$$

subject to $$\binom{N_R}{i} P(\gamma, L, m)^i * (1 - P(\gamma, L, m))^{N_R - i} \leq P_{out},$$

$$N_R(L) \times T(L, m) \leq \text{Deadline}$$

$$D_Z = F(V_R)$$

$$N_F(L) = \frac{D_z}{8L}$$

$L > 0$ where $F(V_R) = GOP \text{ Time} \times 1000 \times V_R$, $D_0$ is a video content complexity, $\theta_0$ is a coding scheme, $R_0$ is an encoder configuration, VR is the video rate, L is the optimal payload length, $N_R$ is a number of total transmitted packets for a group of pictures (GOP), m is a mode of the physical layer including a modulation and coding scheme, $N_F$ is a packet number of a GOP, P is a packet success rate, $\gamma$ is an SNR, and $P_{out}$ is a target outage rate.

11. The video transmission method according to claim 10, wherein the geometric programming algorithm further generates the minimum value of the distortion of the video rate for the single user scenario, represented by a formula (II):

$$\min_{V_R, m, L} D(V_R) = D_0 + \frac{\theta_0}{V_R - R_0}$$

subject to $$D_Z = F(V_R)$$

$$\left\{ N_F + \left( e - \frac{\sqrt{(4 \times N_F) \times (8 \times L \times P_u^m(\gamma))}}{4(1 - 8 \times L \times P_u^m(\gamma))} \right)^2 \right\} \times \left\{ \frac{8L}{R(m)} + O_t(m) \right\} \leq \text{Deadline}$$

$$N_F(L) = \frac{D_Z}{8L}$$

$L \geq 0$.

$$\min_{V_R^s, N_R^s, m^s, L^s} \sum_{s \in S} D^s(V_R^s)$$

$$D_Z^s = F(V_R^s), \forall s \in S,$$

$$\sum_{i^s=0}^{N_F^s - 1} \binom{N_R^s}{i^s} P^s(\gamma^s, L^s, m^s)^{i^s} * (1 - P^s(\gamma^s, L^s, m^s))^{N_R^s - i^s} \leq P_{out}^s, \forall s \in S,$$

$$\sum_{s \in S} N_R^s(L^s) \times T^s(L^s, m^s) \leq \text{Deadline}, \forall s \in S$$

$$N_F^s * (L^s) = \frac{D_Z^s}{8L^s}, \forall s \in S$$

$L^s \geq 0, \forall s \in S.$

12. The video transmission method according to claim 1, wherein the geometric programming algorithm generates a sum of respective minimum values of distortions of video rates for a multi-user scenario, represented by a formula (III):

$$\min_{V_R^s, N_R^s, m^s, L^s} \sum_{s \in S} D^s(V_R^s)$$

subject to $$D_Z^s = F(V_R^s), \forall s \in S$$

$$\sum_{i^s=0}^{N_F^s - 1} \binom{N_R^s}{i^s} P^s(\gamma^s, L^s, m^s)^{i^s} * (1 - P^s(\gamma^s, L^s, m^s))^{N_R^s - i^s} \leq P_{out}^s, \forall s \in S$$

-continued $$\sum_{s \in S} N_R^s(L^s) \times T^s(L^s, m^s) \leq \text{Deadline}, \forall s \in S$$

$$N_F^s(L^s) = \frac{D z^s}{8 L^s}, \forall s \in S$$

$$L^s \geq 0, \forall s \in S$$

wherein S is a user set, $D_0^S$ is a video content complexity in the user set, $\theta_0^S$ is a coding scheme in the user set, $R_0^S$ is an encoder configuration in the user set, $V_R^S$ is the video rate in the user set, $L^S$ is the optimal payload length in the user set, $N_R^S$ is a number of total transmitted packets for a group of pictures (GOP) in the user set, $m^S$ is a mode of the $$\min_{V_R, m, L} D(V_R) = D_0 + \frac{\theta_0}{V_R - R_0}$$

$$D_Z = F(V_R)$$

$$\left\{ N_F + \left( e - \frac{\sqrt{(4 \times N_F) \times (8 \times L \times P_u^m(\gamma))}}{4(1 - 8 \times L \times P_u^m(\gamma))} \right)^2 \right\} \times \left\{ \frac{8L}{R(m)} + 0_t(m) \right\} \leq \text{Deadline}$$

$$N_F(L) = \frac{D_Z}{8L}$$

physical layer including a modulation and coding scheme in the user set, $N_F^S$ is a packet number of a GOP in the user set, $P^S$ is a packet success rate in the user set, $\gamma^S$ is an SNR in $$\min_{V_R^s, q^s, L^s, m^s, k^s} \sum_{s \in S} D^s(V_R^s) = D_0^s + \theta_0^s \times q^s$$

$$N_F^s(L^s) = \frac{D z^s}{8 L^s}, \forall s \in S$$

$$\sum_{s \in S} \left\{ N_F^s + \left( e^s - \sqrt{(4 \times N_F^s) \times (8 \times L^s \times P_u^m(\gamma)^s)} \right)^2 \times k^s \right\} \times$$

$$\left\{ \frac{8 L^s}{R(m)^s} + O_t(m)^s \right\} \leq \text{Deadline}$$

$$\frac{1}{4 k^s} + 8 \times L^s \times P_u^m(\gamma)^s \leq 1, \forall s \in S$$

$$D_Z^s = F(V_R^s), \forall s \in S$$

$$\frac{1}{q^s} + R_0^s \leq V_R^s, \forall s \in S$$

$$L^s \geq 0, \forall s \in S.$$

the user set, and $P_{out}^S$ is a target outage rate in the user set.

13. The video transmission method according to claim 12, wherein the geometric programming algorithm further generates the sum of respective minimum values of distortions of video rates for the multi-user scenario, represented by a formula (IV):

$$\min_{V_R^s, q^s, L^s, m^s, k^s} \sum_{s \in S} D^s(V_R^s) = D_0^s + \theta_0^s \times q^s$$

subject to $$N_F^s(L^s) = \frac{D z^s}{8 L^s}, \forall s \in S$$

$$\sum_{s \in S} \left\{ N_F^s + \left( e^s - \sqrt{(4 \times N_F^s) \times (8 \times L^s \times P_u^m(\gamma)^s)} \right)^2 \times k^s \right\} \times$$

$$\left\{ \frac{8 L^s}{R(m)^s} + 0_t(m)^s \right\} \leq \text{Deadline}$$

$$\frac{1}{4 k^s} + 8 \times L^s \times P_u^m(\gamma)^s \leq 1, \forall s \in S$$

$$D_Z^s = F(V_R^s), \forall s \in S$$

$$\frac{1}{q^s} + R_0^s \leq V_R^s, \forall s \in S$$

$$L^s \geq 0, \forall s \in S.$$

14. A video transmission method for use in a wireless transmission environment, comprising:
  detecting a delay bound in the wireless transmission environment;
  comparing a current packet error rate (PER) and an estimated PER of a video for providing a determined result; and
  automatically adjusting a link profile using a geometric programming scheme based on the delay bound when the determined result indicates that a retransmission of the video is required, wherein the geometric programming scheme uses a geometric programming algorithm to calculate an optimal payload length of a packet and an optimal video rate of the video.

15. A video transmission method for use in a wireless transmission environment, comprising:
  detecting a frame error rate (FER) of a video;
  comparing a current packet error rate (PER) and an estimated PER of the video for providing a determined result; and
  automatically adjusting a link profile using a geometric programming scheme based on the FER when the determined result indicates that a retransmission of the video is required, wherein the geometric programming scheme uses a geometric programming algorithm to calculate an optimal payload length of a packet length and an optimal video rate of the video.

16. The video transmission method according to claim 15, wherein the geometric programming scheme is applied to one selected from a Multiple Inputs Multiple Outputs (MIMO) scheme, an Orthogonal Frequency Division Multiplexing (OFDM) scheme, a Scalable Video Coding (SVC) scheme and an H.264 standard.

* * * * *